(12) United States Patent
Hurd

(10) Patent No.: US 10,642,340 B2
(45) Date of Patent: May 5, 2020

(54) ROTATIONAL GRAPHICS SUB-SLICE AND EXECUTION UNIT POWER DOWN TO IMPROVE POWER PERFORMANCE EFFICIENCY

(71) Applicant: Intel Corporation, Santa Clara, CA (US)

(72) Inventor: Linda L. Hurd, Cool, CA (US)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 15/589,748

(22) Filed: May 8, 2017

(65) Prior Publication Data

US 2017/0315607 A1 Nov. 2, 2017

Related U.S. Application Data

(63) Continuation of application No. 13/631,913, filed on Sep. 29, 2012, now Pat. No. 9,703,364.

(51) Int. Cl.
*G06F 1/3234* (2019.01)
*G06F 1/3293* (2019.01)

(52) U.S. Cl.
CPC .......... *G06F 1/3293* (2013.01); *G06F 1/3278* (2013.01); *Y02D 10/122* (2018.01); *Y02D 10/157* (2018.01)

(58) Field of Classification Search
CPC ....... G06T 1/20; G06F 1/3287; G06F 9/5044;
G06F 1/3243; G06F 1/32; G06F 1/3206;
G06F 1/3203; G06F 1/206; H03K
19/0008; Y02D 10/122; Y02D 10/12;
Y02D 10/124
See application file for complete search history.

(56) References Cited

U.S. PATENT DOCUMENTS

| | | | |
|---|---|---|---|
| 7,802,118 B1* | 9/2010 | Abdalla | G06F 1/08 713/322 |
| 2007/0023878 A1* | 2/2007 | Burton | G06F 1/3203 257/675 |
| 2009/0204837 A1* | 8/2009 | Raval | G06F 1/3203 713/330 |
| 2009/0271141 A1 | 10/2009 | Coskun et al. | |
| 2010/0082943 A1 | 4/2010 | Yamamoto | |
| 2010/0115304 A1 | 5/2010 | Finkelstein et al. | |
| 2010/0295852 A1* | 11/2010 | Yang | G06F 1/3203 345/426 |
| 2011/0289380 A1* | 11/2011 | Wilkerson | G06F 11/1064 714/763 |
| 2012/0146708 A1* | 6/2012 | Naffziger | G06F 1/206 327/512 |

(Continued)

*Primary Examiner* — Jaweed A Abbaszadeh
*Assistant Examiner* — Brian J Corcoran
(74) *Attorney, Agent, or Firm* — Spectrum IP Law Group LLC

(57) ABSTRACT

Methods and apparatus relating to rotational graphics sub-slice and Execution Unit (EU) power down to improve power performance efficiency are described. In one embodiment, power-gating is rotated amongst single sub-slices within each slice of a plurality of slices based on an indication to reduce power consumption of a computational logic. The computational logic includes the plurality of slices and each of the plurality of slices includes a plurality of sub-slices to perform one or more computations. Other embodiments are also disclosed and claimed.

23 Claims, 6 Drawing Sheets

(56) References Cited

U.S. PATENT DOCUMENTS

| | | |
|---|---|---|
| 2012/0166838 A1 | 6/2012 | Nasrullah et al. |
| 2012/0169747 A1* | 7/2012 | Kaburlasos ............... G06T 1/20 |
| | | 345/522 |
| 2012/0290994 A1 | 11/2012 | Mbouombouo et al. |
| 2013/0015904 A1 | 1/2013 | Priel et al. |
| 2013/0173938 A1* | 7/2013 | Yang ......................... G06F 1/26 |
| | | 713/300 |
| 2013/0286026 A1* | 10/2013 | Kaburlasos ............. G06F 1/324 |
| | | 345/501 |
| 2013/0328890 A1 | 12/2013 | Avkarogullari et al. |
| 2014/0085501 A1 | 3/2014 | Tran |
| 2014/0092106 A1 | 4/2014 | Hurd et al. |
| 2014/0095912 A1 | 4/2014 | Hurd et al. |
| 2015/0177796 A1 | 6/2015 | Bose et al. |

\* cited by examiner

ROTATIONAL GRAPHICS SUB-SLICE AND EXECUTION UNIT POWER DOWN TO IMPROVE POWER PERFORMANCE EFFICIENCY

RELATED APPLICATIONS

This application is a continuation and claims priority under 35 U.S.C. § 120 of pending U.S. patent application Ser. No. 13/631,913, filed Sep. 29, 2012, entitled ROTATIONAL GRAPHICS SUB-SLICE AND EXECUTION UNIT POWER DOWN TO IMPROVE POWER PERFORMANCE EFFICIENCY. The entire disclosure(s) of these documents are incorporated by reference herein for all purposes.

FIELD

The present disclosure generally relates to the field of electronics. More particularly, an embodiment of the invention relates to rotational graphics sub-slice and Execution Unit (EU) power down to improve power performance efficiency.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or applications of a computing device that includes such chips. For example, a portable computing device may solely rely on battery power. Hence, as additional functionality is integrated into portable computing devices, the need to reduce power consumption becomes increasingly important, for example, to maintain battery power for an extended period of time. Non-portable computing systems also face cooling and power generation issues as their IC components use more power and generate more heat.

One type of component that tends to use a significant amount of power is the graphics circuitry included on some integrated circuit chips. Hence, controlling the power consumption of the graphics circuitry may have a direct effect on overall system power consumption.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
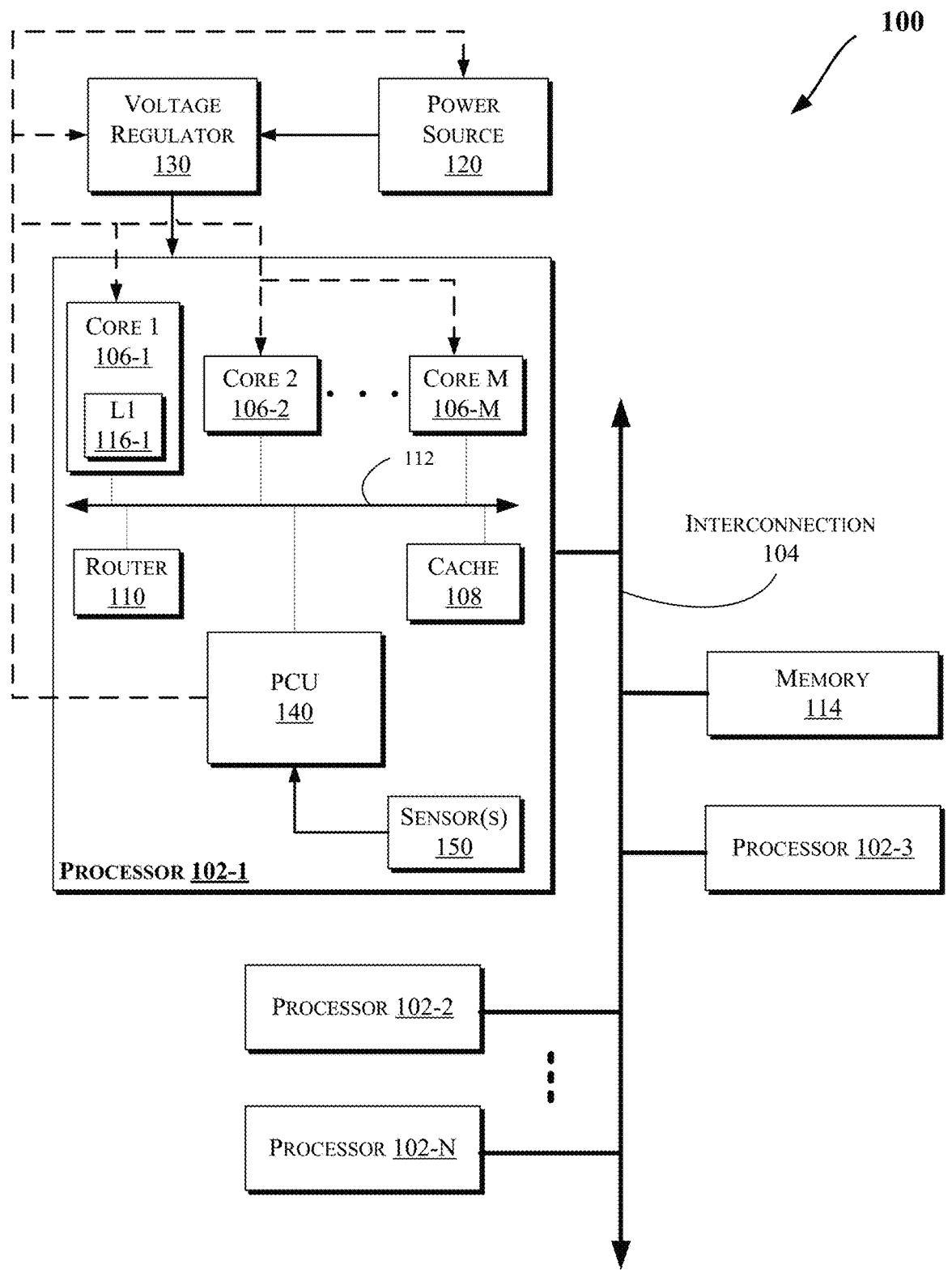
FIGS. 1, 5, and 6 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments provide for rotational graphics sub-slice and/or Execution Unit (EU) power down to improve power performance efficiency. As discussed herein, a graphics module or graphics logic may include one or more slices, where each slice may include one or more sub-slices. Also, each "sub-slice" may include one or more: computational unit(s) (also referred to as EUs), texture sampler logic (more generally referred to as a "sampler" or "texture sampler"), a data cluster(s), and/or data port(s). Each EU may in turn include a plurality of (e.g., four) processing elements (such as ALUs (Arithmetic Logic Units), which may perform the role of shader processor(s)). In various embodiments, the EU may be any type of a processing elements such as any of the processors discussed herein (including for example a graphics processor or Graphics Processing Unit (GPU)). Such embodiments may more efficiently utilize the available graphics power budget, e.g. within the frequency scaling range, in some low-power consumption computing platforms, such as ULT (Ultrabook) or ultra-mobile products or any other products which use multiple sub-slices (e.g., having GT3, GT4, GT5, etc. graphics modules or graphics logic, whether or not the graphic modules/logic are integrated (i.e., into the same IC chip as a processor) or discrete (i.e., on a separate IC chip as a processor). As discussed herein, "GT" generally refers to a graphics module or graphics logic (such as a GPU, a general-purpose processor, etc.) that performs one or more graphics-related computations such as High Definition (HD) and non-HD graphics computations and/or operation(s) that manipulate an image, frame, scene, etc., e.g., as will be further discussed here. The GT may include a plurality of sub-slices and/or EUs.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 6 and/or 7, including for example a flat panel display device, etc.).

Also, some embodiments are performed based on one or more of: GT power consumption, GT average temperature, and/or temperature values in sub-slices (where a plurality of sub-slices, slice common logic, and L3$ (third level cache) form a slice of a GT, see, e.g., FIG. 2). In an embodiment, each sub-slice includes one or more EUs. In some embodiments, some ranges of GT dynamic capacitance associated with a workload (Cdyn_workload), GT power budget, and/or GT temperatures exist across which configuring GT with 1 sub-slice (or EU) per slice power gated off (or powered/shut off, e.g., by turning off the supply of power provided/gated through a power transistor or other power gating device) would result in higher frame rate than shutting down a full slice of a GT or an entire GT.

Furthermore, some embodiments provide power performance efficiency through dynamically changing (or rotating) which sub-slice (or EU) per slice is power gated in a GT by leveraging one or more of: (1) the temperature dependency of leakage power; (2) the average temperature of GT during turbo scenario(s) in the (e.g., ULT) package; (3) power leakage/consumption differential between adjacent GT frequency bins (which may be a small power differential); and/or (4) the ratio of leakage to dynamic power within the allotted GT power budget. Generally, a turbo operation (also referred to as turbo boost) allows processor core(s) to run faster than the base operating frequency (for a period of time) if they are operating below power, current, and/or temperature specification limits.

In an embodiment, logic (e.g., PCU logic 140 of FIG. 1, for example through the voltage regulator 130 of FIG. 1) dynamically changes (or rotates) which sub-slice (or EU) per slice is power gated in a GT, e.g., based on temperature, power leakage, bin frequency differentials, or other information discussed herein (e.g., as detected by sensor(s) 150 of FIG. 1 at sub-slice(s)/EU(s) or slice(s) of a GT). This allows for some slight alteration of the dynamic flow of heat (and the temperature gradient). Also, the overall average temperature in the GT may be lowered, leading to less leakage power. In one embodiment, the frequency of the rotation is controlled by logic and could be done at frame boundary, such as when the GT is done performing its assigned task(s) (i.e., has no remaining work to be done). In each slice, the rotation may involve shutting down or power gating one sub-slice and applying power to the sub-slice which was previously shut down/power gated off. Also, the residency or time spent in each rotation configuration need not be equal, and the optimal full-cycle period may differ from workload to workload. Such embodiments may also be applied to maximum GT operating current (Icc_max) instead of aforementioned GT parameters such as GT power consumption or GT average temperature.

Moreover, some embodiments may be applied in computing systems that include one or more processors (e.g., with one or more processor cores), such as those discussed with reference to FIGS. 1-6, including for example mobile computing devices such as smart phones, tablets, portable game consoles, etc.). More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 5-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core, group of cores, or different sub-slices/EUs discussed herein). Power source may be capable of driving variable voltage or have different power drive configurations. In an embodiment, power may be supplied to each sub-slice/EU discussed herein via a power-gating logic (such as a power transistor) to allow for powering down or up of each sub-slice/EU individually as will be further discussed herein, e.g., with reference to FIGS. 2 and/or 3.

Additionally, while FIG. 1 illustrates the power source 120 and the voltage regulator 130 as separate components, the power source 120 and the voltage regulator 130 may be integrated and/or incorporated into other components of system 100. For example, all or portions of the VR 130 may be incorporated into the power source 120 and/or processor 102. Furthermore, as shown in FIG. 1, the power source 120 and/or the voltage regulator 130 may communicate with the power control logic 140 and report their power specification.

As shown in FIG. 1, the processor 102 may further include a Power Control Unit (PCU) logic 140 to control supply of power to one or more components of the processor 102 (e.g., cores 106, sub-slices, EUs, etc.). Logic 140 may have access to one or more storage devices discussed herein (such as cache 108, L1 cache 116, memory 114, register(s), or another memory in system 100) to store information relating to operations of the PCU logic 140 such as information communicated with various components of system 100.

As shown, the logic 140 may be coupled to the VR 130 and/or other components of system 100 such as the cores 106 and/or the power source 120. For example, the PCU logic 140 may be coupled to receive information (e.g., in the form of one or more bits or signals) to indicate status of one or more sensors 150 (where the sensor(s) 150 may be located proximate to (or otherwise physically coupled to) one or more components of system 100 (or other computing systems discussed herein such as those discussed with reference to other figures including 2-6, for example), such as one or more of the cores 106, interconnections 104 or 112, sub-slice(s)/EU(s) of FIG. 2, etc., to sense variations in various factors affecting power/thermal behavior of the system, such as temperature, operating frequency, operating voltage, operating current, dynamic capacitance, power consumption, inter-core communication activity, etc.). Also, even though cores 106 are shown to be processor cores, these can be other computational element such as graphics cores, special function devices, GT(s), etc.

Figure 2:
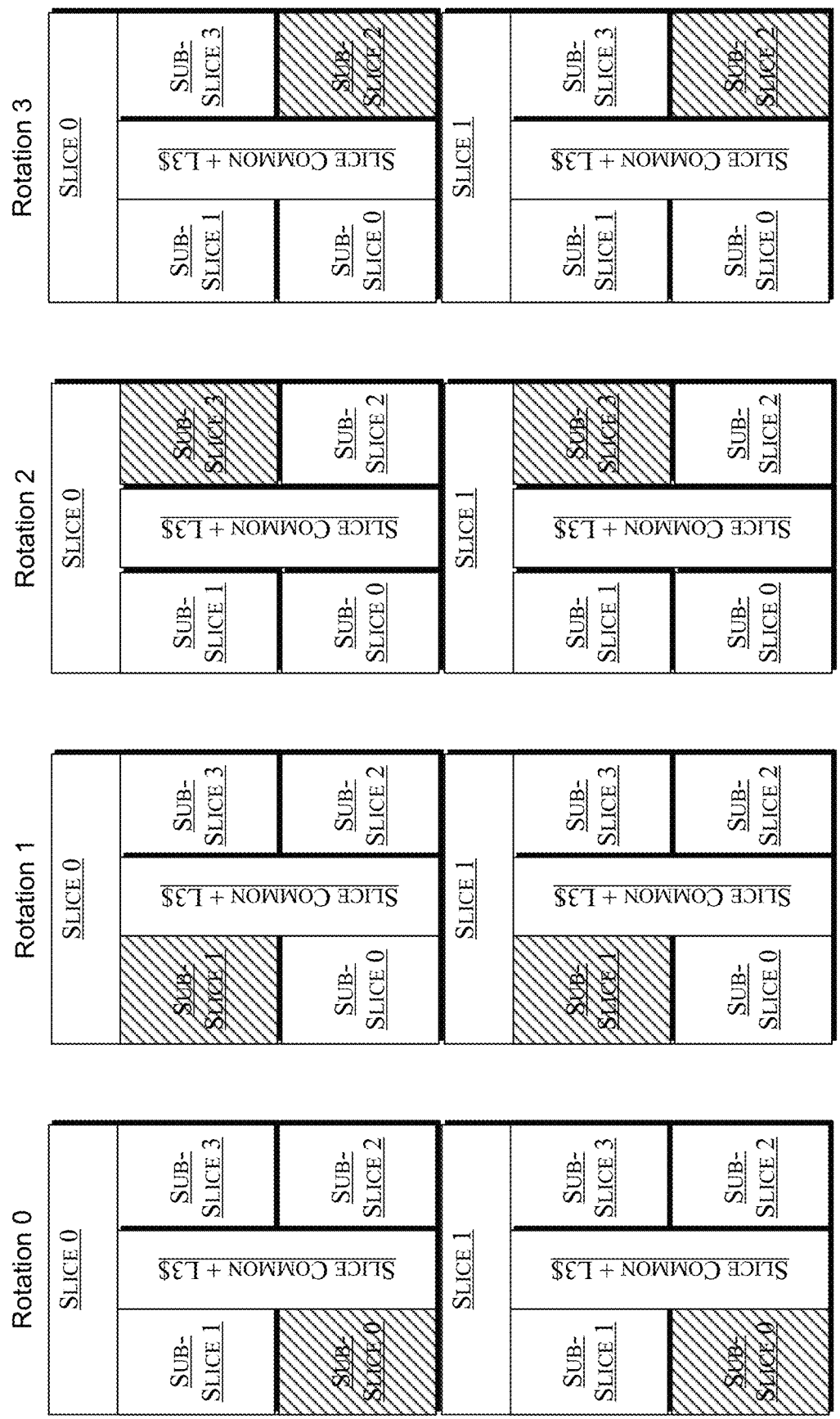
FIG. 2 illustrates a block diagram of rotational shutting off of graphics sub-slices of a graphics logic, according to an embodiment.

FIG. 2 illustrates a block diagram of a graphics logic capable of rotational shutting off of graphics sub-slices of the graphics logic, according to an embodiment. FIG. 2 shows four sample rotations of a GT. As shown, each GT may have two slices (labeled slice 0 and slice 1), where each slice in turn includes four sub-slices (labeled sub-slice 0 to sub-slice 3). However, embodiments are not limited to four sub-slices and more or less sub-slices may be present in each slice of GT. Also, each slice may include a slice common logic (e.g., to perform operations common to the sub-slices/ slice) and L3$ (e.g., to store information/data) as shown in FIG. 2. The shaded sub-slices indicate which sub-slices are shut off or powered off during each rotation according to some embodiments. While sub-slices in the same column are powered off in the embodiment of FIG. 2, sub-slices (or EUs) within a row may be instead power-gated during the same rotation, e.g., shutting off sub-slice 1 of slice 0 and sub-slice 3 of slice 1 during rotation 1, shutting off sub-slice 0 of slice 0 and sub-slice 2 of slice 1 during rotation 1, etc.

As shown in the example of FIG. 2, logic (e.g., PCU 140 via VR 130) dynamically changes (or rotates) which sub-slice (or EU) per slice is power gated in a GT. This allows for some slight alteration of the dynamic flow of heat (and the temperature gradient). Also, the overall average temperature in the GT may be lowered, leading to less leakage power. In one embodiment, the frequency of the rotation is controlled by logic and could be done at frame boundary, such as when the GT is done performing its assigned task(s) (i.e., has no remaining work to be done). Also, the rotation may be done at intra-frame (i.e., partway through a frame), which would require more control logic to support at the sub-slice level. For EUs, the shutdown/rotation may be done either at frame boundary or intra-frame (e.g., allowing the work on EU drain out/complete before performing the shutdown/rotation). In each slice, the rotation may involve shutting down or power gating one sub-slice and applying power to the sub-slice which was previously shut down/ power gated off. Also, the residency or time spent in each rotation configuration need not be equal and the optimal full-cycle period may differ from workload to workload. Moreover, the power down operation is accomplished by power-gating or FIVR shutdown (where "FIVR" refers to a Fully Integrated Voltage Regulator) in some embodiments.

Figure 3:
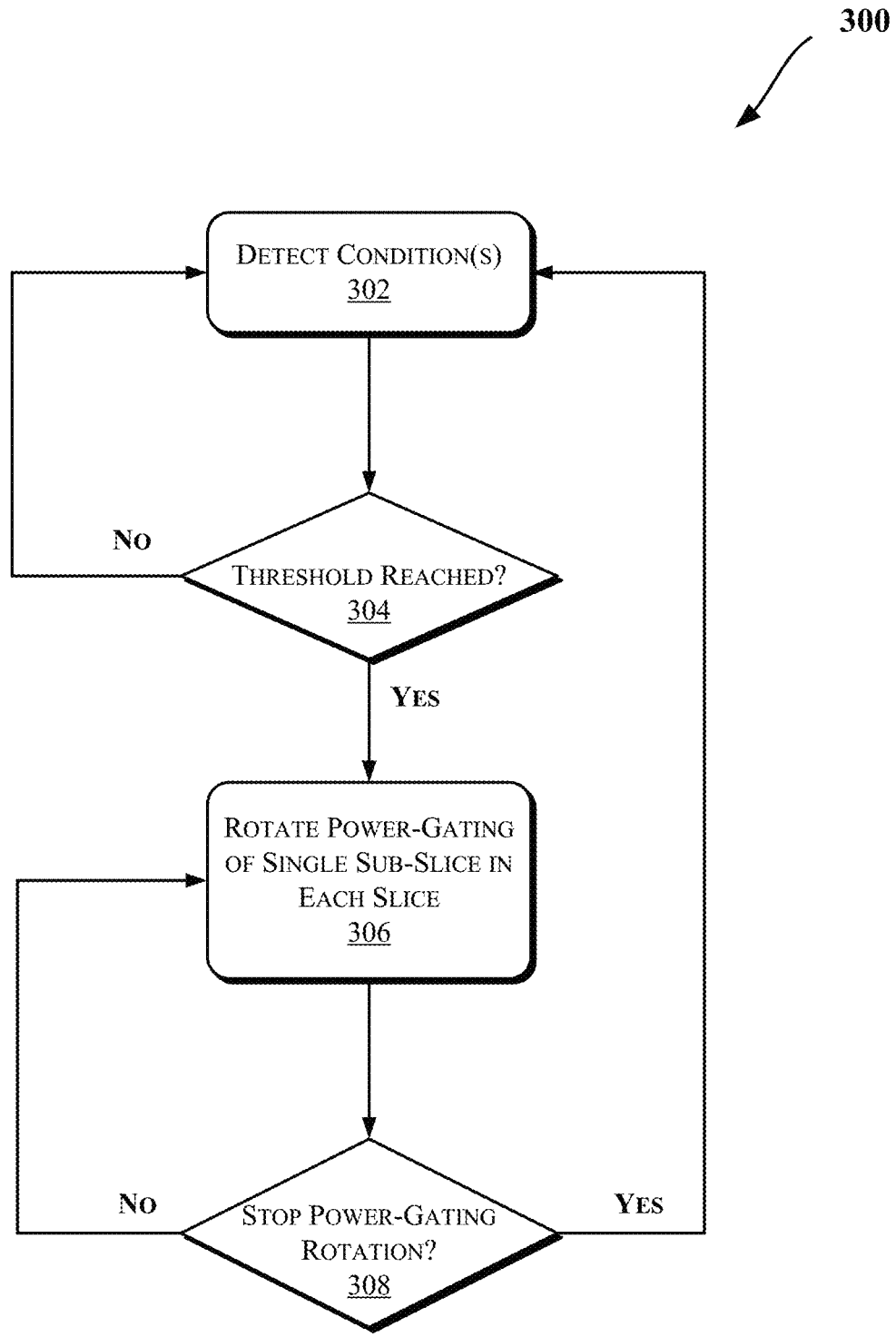
FIG. 3 illustrates a flow diagram of a method, according to an embodiment.

FIG. 3 illustrates a flow diagram of a method 300 to provide dynamic rotation of graphics sub-slices and/or EUs power down to improve power performance efficiency, according to an embodiment. In some embodiments, various components discussed with reference to FIGS. 1-2 and 5-6 may be utilized to perform one or more of the operations discussed with reference to FIG. 3.

Referring to FIG. 3, at an operation 302 one or more conditions may be detected (e.g., by the sensor(s) 150). At an operation 304, if any threshold value associated with the condition(s) of operation 302 are reached (e.g., high temperature at select component(s)), the method 300 continues with operation 306 that causes rotation of power-gating of single sub-slice in each slice of a GT (such as discussed with reference to FIGS. 1-2). At an operation 308, it is determined whether to stop the rotating power-gating of operation 306 (e.g., based on an indication that a select condition has been reached based on elapsed time (e.g., per expiration of a time (not shown)), conditions detected by sensor(s) 150 (e.g., reduced temperature at select component(s)), etc. If so, the method 300 resumes at operation 302; otherwise, method 300 resumes at operation 306.

Figures 4A, 4B:
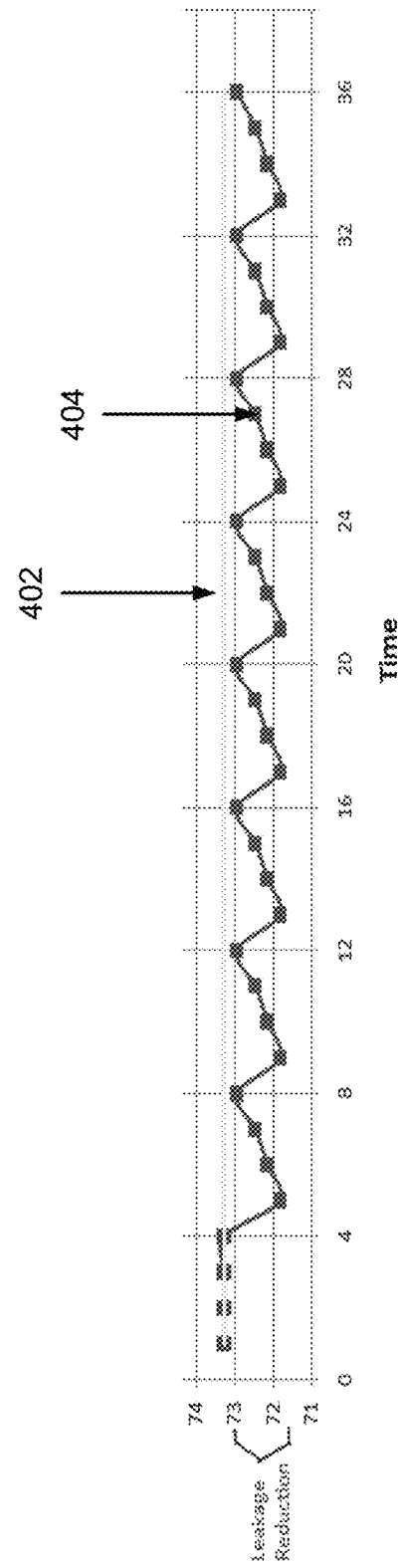
FIG. 4A illustrates a sample table with bin gain values, according to some embodiments.
FIG. 4B illustrates a graph of temperature vs. time, according to an embodiment.

In an embodiment, the following assumptions are made to determine the amounts of estimated frequency bin gain due to rotating the power gated sub-slice: (a) for an average GT temperature of 100 C, rotation reduces average temperature to 96.5 C; (b) for an average GT temperature of 90 C, rotation reduces average temperature to 87 C; (c) for an average GT temperature of 80 C, rotation reduces average temperature to 78 C; (d) for an average GT temperature of 70 C, rotation reduces average temperature to 69 C; (e) for an average GT temperature of 60 C, rotation reduces average temperature to 59 C; and (f) for an average GT temperature of 50 C, rotation reduces average temperature to 49 C. FIG. 4A illustrates the resulting estimated GT frequency bin gain, according to an embodiment. The GT frequency bin gain (at 25 MHz steps) as a result of rotating power-gated sub-slice may range from 0 up to 2 bins across average GT temperature of 50 C-100 C for 3 Cdyn_workload assumptions: 18 nF, 20 nF, and 22 nF. FIG. 4B illustrates a graph of temperature versus time, according to an embodiment. Line 402 illustrates a sample average temperature for graphics logic. The power reduction (labeled as "leakage reduction") is shown for a sub-slice power gated and without rotation (line 402) relative to a sub-slice power gated and with rotation (line 404, which shows a saw tooth waveform behavior).

Figure 5:
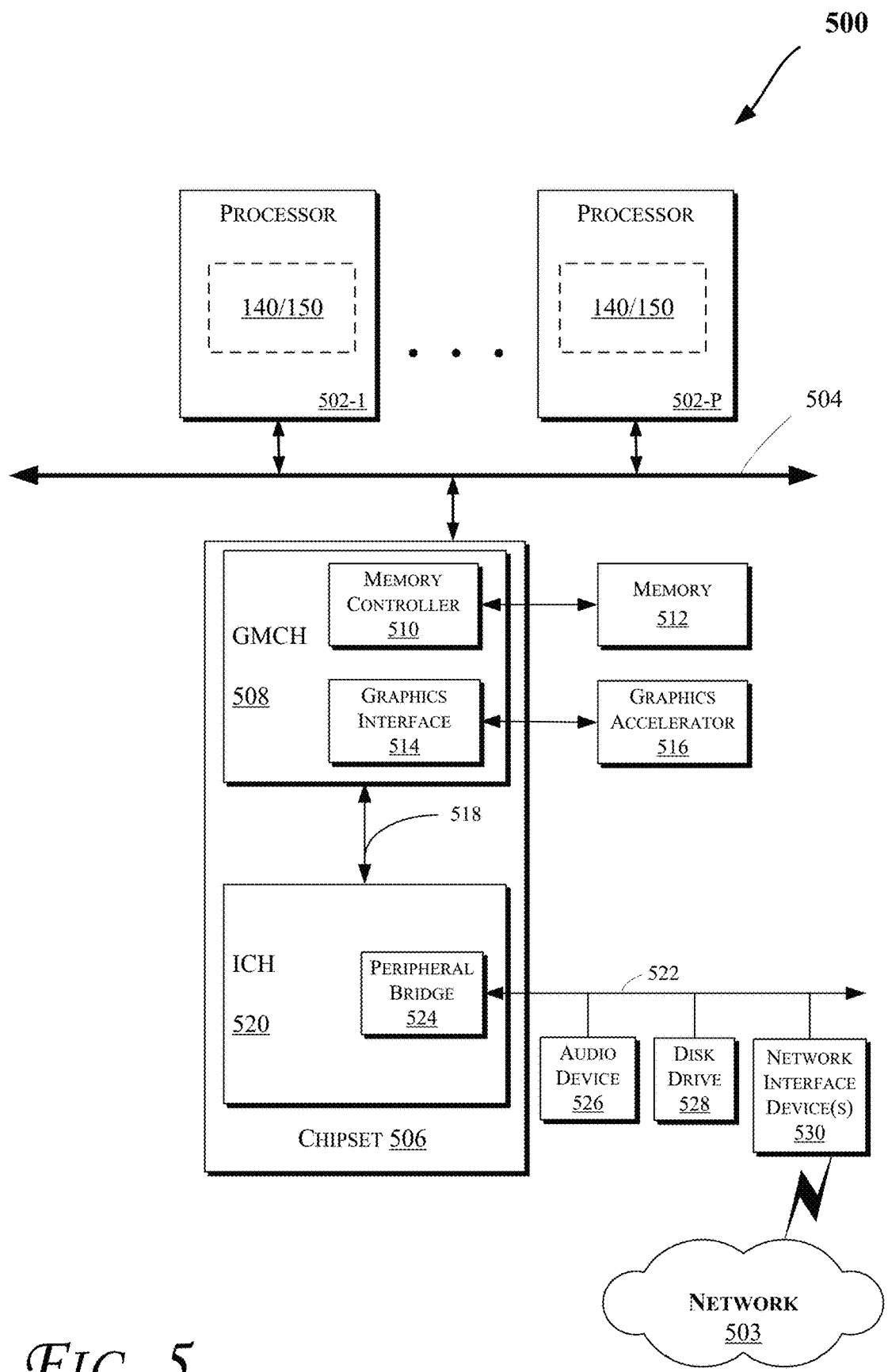

FIG. 5 illustrates a block diagram of a computing system 500 in accordance with an embodiment of the invention. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design.

The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. In some embodiments, one or more of the processors 502 may include one or more of the cores 106, logic 140, sensor(s) 150, of FIG. 1. Also, the operations discussed with reference to FIGS. 1-4 may be performed by one or more components of the system 500. For example, a voltage regulator (such as VR 130 of FIG. 1) may regulate voltage supplied to one or more components of FIG. 5 at the direction of logic 140.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display, a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

Figure 6:
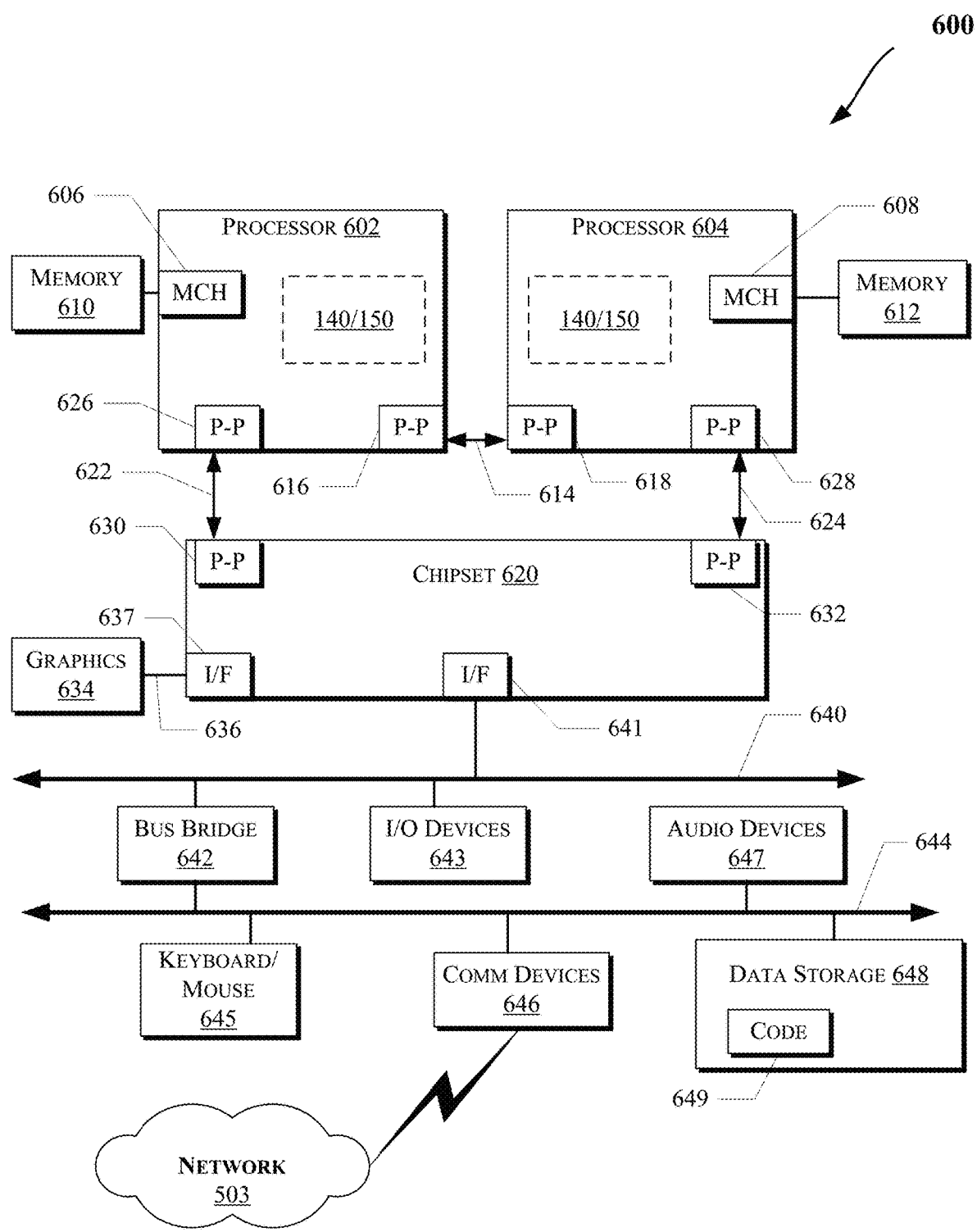

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600. For example, a voltage regulator (such as VR 130 of FIG. 1) may regulate voltage supplied to one or more components of FIG. 6.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. Also, the processors 602 and 604 may include one or more of the cores 106, logic 140, and/or sensor(s) 150 of FIG. 1.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, one or more operations discussed with reference to FIGS. 1-5 may be performed by the processors 602 or 604 and/or other components of the system 600 such as those communicating via a bus 640. Other embodiments of the invention, however, may exist in other circuits, logic units, or devices within the system 600 of FIG. 6. Furthermore, some embodiments of the invention may be distributed throughout several circuits, logic units, or devices illustrated in FIG. 6.

Chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   a plurality of processor cores, wherein the processor comprises a first portion and a second portion, wherein the first portion comprises one or more of the plurality of processor cores and a level 2 (L2) cache, wherein the second portion comprises a level 3 (L3) cache;
   at least one voltage regulator logic circuitry to control supply of voltage to one or more of the plurality of processor cores;
   on-chip power management logic circuitry to cause power-gating amongst the first portion or the second portion of the processor based at least in part on an indication to reduce power consumption of the first portion or the second portion; and
   one or more on-chip sensors to sense one or more value variations in one or more of: temperature, voltage, current, and activity for one or more of the plurality of processor cores, wherein the indication to reduce power consumption is based on the one or more value variations, wherein the on-chip power management logic circuitry is to cause rotation of power-gating amongst one or more portions of the plurality of processor cores, wherein the on-chip power management logic circuitry is to cause a first time period spent in a first rotation to have a different period than a second time period spent in a second rotation.

2. The processor of claim 1, wherein the on-chip power management logic circuitry is to cause power-gating of a portion of a first processor core of the plurality of processor cores while allowing turbo operation of a second processor core of the plurality of processor cores.

3. The processor of claim 1, wherein the processor is to comprise a Graphics Processing Unit (GPU).

4. The processor of claim 1, wherein the one or more on-chip sensors are to further detect one or more of: dynamic capacitance, frequency, and power consumption.

5. The processor of claim 1, wherein the on-chip power management logic is to cause rotation of power-gating amongst one or more portions of the plurality of processor cores, wherein residency in each rotation of power-gating is capable to differ for portions of the plurality of processor cores.

6. The processor of claim 1, wherein the first portion is to comprise a plurality of slices, wherein each of the plurality of slices is to comprise a plurality of sub-slices.

7. The processor of claim 6, wherein the on-chip power management logic is to cause each powered down sub-slice within each slice of the plurality of slices to be powered up in response to expiration of a timer.

8. The processor of claim 6, wherein each sub-slice is to comprise one or more execution units.

9. The processor of claim 8, wherein each of the one or more execution units is to comprise a plurality of processing elements.

10. The processor of claim 9, wherein each of the plurality of processing elements is to comprise one or more ALUs (Arithmetic Logic Units), wherein each of the one or more ALUs is to perform the role of a shader processor.

11. The processor of claim 1, wherein the on-chip power management logic is to cause rotation of power-gating amongst one or more portions of the plurality of processor cores based on information detected at the one or more on-chip sensors.

12. The processor of claim 1, wherein one or more of the first portion and second portion, one or more voltage regulators, the on-chip power management logic, the one or more on-chip sensors, and memory are on a single integrated circuit die.

13. A single chip comprising:
   memory controller coupled to memory, the memory to store one or more instructions;
   a processor having a plurality of processor cores to execute the one or more instructions, wherein the processor comprises a first portion and a second portion, wherein the first portion comprises one or more of the plurality of processor cores and a level 2 (L2) cache, wherein the second portion comprises a level 3 (L3) cache;
   at least one voltage regulator logic circuitry to control supply of voltage to one or more of the plurality of processor cores;
   on-chip power management logic circuitry to cause power-gating amongst the first portion or the second portion of the processor based at least in part on an indication to reduce power consumption of the first portion or the second portion; and one or more on-chip sensors to sense one or more value variations in one or more of: temperature, voltage, current, and activity for one or more of the plurality of processor cores, wherein the indication to reduce power consumption is based on the one or more value variations, wherein the on-chip power management logic circuitry is to cause rotation of power-gating amongst one or more portions of the plurality of processor cores, wherein the on-chip power management logic circuitry is to cause a first time period spent in a first rotation to have a different period than a second time period spent in a second rotation.

14. The chip of claim 13, wherein the on-chip power management logic circuitry is to cause power-gating of a portion of a first processor core of the plurality of processor cores while allowing turbo operation of a second processor core of the plurality of processor cores.

15. The chip of claim 13, wherein each of the plurality of processor cores are to comprise an execution unit.

16. The chip of claim 13, wherein the on-chip power management logic is to cause rotation of power-gating amongst one or more portions of the plurality of processor cores, wherein residency in each rotation of power-gating is capable to differ for portions of the plurality of processor cores.

17. The chip of claim 13, wherein the first portion is to comprise a plurality of slices, wherein each of the plurality of slices is to comprise a plurality of sub-slices.

18. A method comprising:
   performing, at a processor, one or more computations, wherein the processor comprises a first portion and a second portion, wherein the first portion comprises one or more of a plurality of processor cores and a level 2 (L2) cache, wherein the second portion comprises a level 3 (L3) cache, wherein the processor comprises at least one voltage regulator logic circuitry to control supply of voltage to one or more of the plurality of processor cores; and
   causing power-gating, at on-chip power management logic circuitry, amongst the first portion or the second portion of the processor based at least in part on an indication to reduce power consumption of the first portion or the second portion, wherein the indication is based on one or more value variations, detected at one or more on-chip sensors, in one or more of: temperature, voltage, current, and activity for one or more of the plurality of processor cores, wherein the on-chip power management logic circuitry causes rotation of power-gating amongst one or more portions of the plurality of processor cores, wherein the on-chip power management logic circuitry causes a first time period spent in a first rotation to have a different period than a second time period spent in a second rotation.

19. The method of claim 18, further comprising the on-chip power management logic circuitry causing power-gating of a portion of a first processor core of the plurality of processor cores while allowing turbo operation of a second processor core of the plurality of processor cores.

20. The method of claim 18, further comprising the on-chip power management logic circuitry causing rotation of power-gating amongst one or more portions of the plurality of processor cores, wherein residency in each rotation of power-gating is capable to differ for portions of the plurality of processor cores.

21. One or more non-transitory computer-readable medium comprising one or more instructions that when executed on at least one processor configure the at least one processor to perform one or more operations to:
   perform, at the processor, one or more computations, wherein the processor comprises a first portion and a second portion, wherein the first portion comprises one or more of a plurality of processor cores and a level 2 (L2) cache, wherein the second portion comprises a level 3 (L3) cache, wherein the processor comprises at least one voltage regulator logic circuitry to control supply of voltage to one or more of the plurality of processor cores; and
   cause power-gating, at on-chip power management logic circuitry, amongst the first portion or the second portion of the processor based at least in part on an indication to reduce power consumption of the first portion or the second portion, wherein the indication is based on one or more value variations, detected at one or more on-chip sensors, in one or more of: temperature, voltage, current, and activity for one or more of the plurality of processor cores, wherein the on-chip power management logic circuitry is to cause rotation of power-gating amongst one or more portions of the plurality of processor cores, wherein the on-chip power management logic circuitry is to cause a first time period spent in a first rotation to have a different period than a second time period spent in a second rotation.

22. The one or more non-transitory computer-readable medium of claim 21, further comprising one or more instructions that when executed on the at least one processor configure the at least one processor to perform one or more operations to cause the on-chip power management logic circuitry to cause power-gating of a portion of a first processor core of the plurality of processor cores while allowing turbo operation of a second processor core of the plurality of processor cores.

23. The one or more non-transitory computer-readable medium of claim 21, further comprising one or more instructions that when executed on the at least one processor configure the at least one processor to perform one or more operations to cause the on-chip power management logic circuitry to cause rotation of power-gating amongst one or more portions of the plurality of processor cores, wherein residency in each rotation of power-gating is capable to differ for portions of the plurality of processor cores.

* * * * *